Patented Mar. 6, 1928.

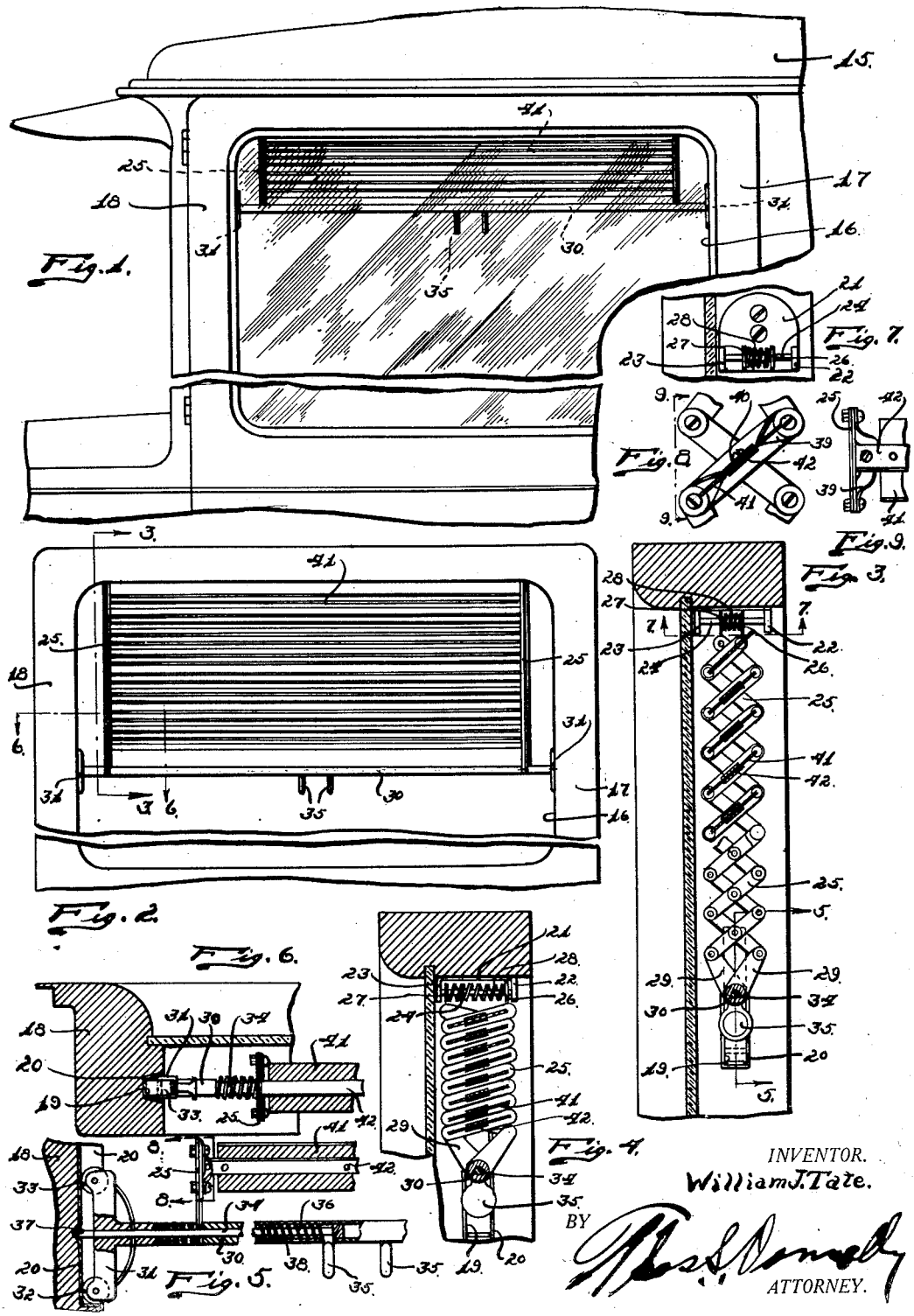

1,661,709

UNITED STATES PATENT OFFICE.

WILLIAM J. TATE, OF FLINT, MICHIGAN.

VENTILATING SUNSHADE.

Application filed April 30, 1927. Serial No. 187,813.

My invention relates to a new and useful improvement in a ventilating sun shade adapted for shading from the sun and permitting the passage of air therethrough. It is adapted for various uses, but particularly for use on vehicles, and I have illustrated the invention as applied to an automobile.

In the driving of automobiles it is often desirable to shade the occupants thereof from the rays of the sun, particularly when directed from the side of the vehicle. It is an object of the present invention to provide a ventilating sun shade by which the light rays may be shaded from the occupants of the vehicle and the passage of air therethrough permitted, so that the advantages of an open car may be attained, while at the same time, the annoyance of excessive sun rays avoided.

It is another object of the invention to provide a ventilating sun shade of this class which will be simple in structure, economical of manufacture and highly efficient in use.

Another object of the invention is the provision of a sun shade which may be easily and quickly operated, and so constructed and arranged as to obviate the disarrangement of its various parts.

Another object of the invention is the provision of a sun shade having a plurality of shade members mounted on lazy tongs.

Other objects will appear hereinafter.

The invention consists in the combination and arrangement of parts hereinafter described and claimed.

The invention will be best understood by a reference to the accompanying drawings which form a part of this specification and in which, Fig. 1 is a fragmentary side elevational view of a vehicle showing the invention applied with the sun shade raised.

Fig. 2 is a fragmentary view similar to Fig. 1 showing the sun shade lowered.

Fig. 3 is a fragmentary sectional view taken on substantially line 3—3 of Fig. 2.

Fig. 4 is a fragmentary view similar to Fig. 3 showing the sun shade raised.

Fig. 5 is a fragmentary sectional view taken on substantially line 5—5 of Fig. 4.

Fig. 6 is a fragmentary sectional view taken on substantially line 6—6 of Fig. 2.

Fig. 7 is a fragmentary sectional view taken on substantially line 7—7 of Fig. 3.

Fig. 8 is a fragmentary sectional view taken on substantially line 8—8 of Fig. 5.

Fig. 9 is a fragmentary side elevational view taken on substantially line 9—9 of Fig. 8.

In the drawings I have illustrated a vehicle body 15 having a window opening 16 formed therein. Formed in each of the side rails 17 and 18 of the window frame is a groove 19 in which is positioned a U shaped wear plate 20. At opposite sides of the window opening is mounted a plate 21 projecting outwardly from which are lugs 22 and 23 which serve as a support for the pin 24. A lazy tongs 25 is provided, on the free end of each of the upper links of which are links 26 and 27, through which the pin 24 is projected, a coil spring 28 being positioned on the pin 24 in embracing relation and serving normally to space the links 26 and 27 apart, so that the tendency of the spring 28 is to collapse the lazy tongs 25. The free end of the lower links 29 of the lazy tongs is positioned in embracing relation on a sleeve 30 which carries at its opposite ends a cross head 31 provided with a pair of rollers 32 and 33 which engage in the wear plate 20. The opposite ends of the sleeve 30 are similarly constructed and provided with the same mechanism, so that a description of one side will serve as a description of both.

Slidably mounted in the sleeve 30 and projecting outwardly to the end through substantially the medial line thereof, is a rod 34 which is provided with the angularly turned finger piece 35 and normally held by the spring 36 in outwardly pressed position for engagement in the pocket 37 formed in the base of the wear plate 20, the finger grips 35 riding in the slot 38. Secured to one side of each of the similarly directed links of the lazy tongs 25 is a plate having its ends 39 twisted relatively to its center 40, so that the ends lie flat in engagement with the link upon which they are mounted and the center of the plate extends vertically to the link. Riveted or in any manner suitably secured to the vertically extending portions 40 of the plates are closures 41 which may be translucent or opaque, as desired, a reinforcing plate 42 being positioned at one side to prevent tearing of this shade member inasmuch as the shade member may be made of celluloid, or other similar material.

In operation, after the device has been mounted upon an opening as explained, upon approach of the finger grips 35, the rod 34 will be disengaged from the openings 37.

The tension of the spring 28 will serve then normally to collapse the lazy tongs so that a raising of the shade will be permitted, the shade moving into the position when in raised or collapsed form shown in Fig. 1 and Fig. 4.

When it is desired to use the device as a shading member the finger grips 35 being moved into relative approach, the rod 34 will disengage from the openings 37 and permit a downward movement of the shade, as shown in Fig. 2 and Fig. 4.

In this manner the shade members 41 will serve effectively to shade one side of the device from the sun's rays while at the same time, the filtration of air through the shade member is permitted.

While I have illustrated and described the preferred form of my invention I do not wish to limit myself to the precise details of structure shown, but desire to avail myself of such variations and modifications as come within the scope of the appended claim.

Having thus described my invention what I claim as new and desire to secure by Letters Patent is:

In a ventilating sun shade of the class described a plurality of lazy tongs; a plate mounted on alternate similarly directed links of said tongs, the central portion of said plate being twisted to extend perpendicularly to the link; and a sun shade mounted on said perpendicularly extended portion.

In testimony whereof I have signed the foregoing specification.

WILLIAM J. TATE.